United States Patent [19]

Ragaly

[11] 4,437,846
[45] Mar. 20, 1984

[54] SPEED LIMITING ROTARY COUPLING

[75] Inventor: Istvan Ragaly, Schwieberdingen, Fed. Rep. of Germany

[73] Assignee: Robert Bosch GmbH, Stuttgart, Fed. Rep. of Germany

[21] Appl. No.: 198,967

[22] Filed: Oct. 20, 1980

[30] Foreign Application Priority Data

Oct. 23, 1979 [DE] Fed. Rep. of Germany ....... 2942737

[51] Int. Cl.³ ............................................. F16D 7/06
[52] U.S. Cl. ...................................... 464/36; 464/10; 310/53
[58] Field of Search ................... 464/9, 10, 30, 35, 36, 464/41, 46; 192/56 R; 310/52, 53

[56] References Cited

U.S. PATENT DOCUMENTS

| | | | |
|---|---|---|---|
| 2,601,012 | 6/1952 | Wolff | 464/10 |
| 3,818,722 | 6/1974 | Vogee | 464/10 |
| 3,979,925 | 9/1976 | Kato | 464/35 |
| 3,985,213 | 10/1976 | Braggins | 192/56 R |
| 4,214,459 | 7/1980 | Leitner | 192/56 R |
| 4,235,321 | 11/1980 | Stein | 192/56 R |
| 4,311,224 | 1/1982 | Kato et al. | 464/36 |

FOREIGN PATENT DOCUMENTS 2053263 4/1976 Fed. Rep. of Germany .
2822638 11/1979 Fed. Rep. of Germany .

*Primary Examiner*—Billy S. Taylor
*Attorney, Agent, or Firm*—Frishauf, Holtz, Goodman & Woodward

[57] ABSTRACT

A normally lubricated bearing, typically a ball bearing, serves to transmit torque from a drive shaft for the fan wheel of an alternator. The driving and driven bearing surfaces form the coupling parts respectively on the drive side and the delivery side of the coupling. A cup spring is useful to control the bearing friction that must be overcome at a limiting speed at which the drive shaft begins to turn faster than the driven device. Such couplings are useful for engine fans, pumps, or other similar auxilary devices in motor vehicles.

14 Claims, 7 Drawing Figures

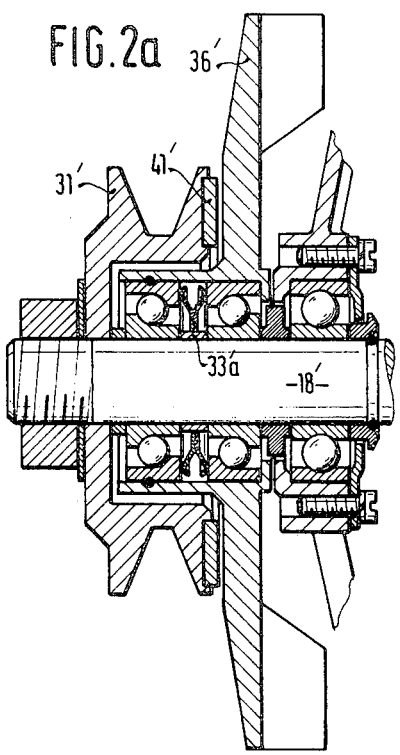
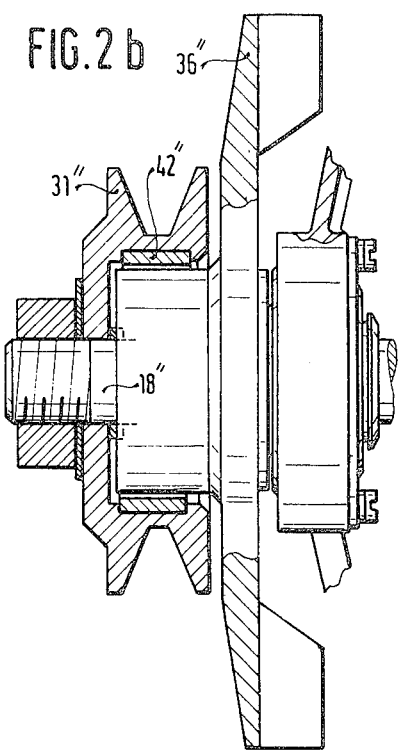
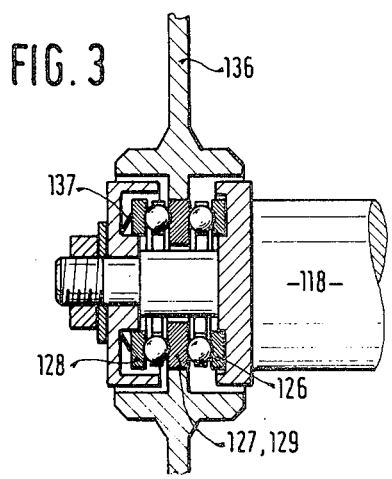

SPEED LIMITING ROTARY COUPLING

This invention concerns a coupling between a driving rotary member such as a pulley on the fan belt of an internal combustion engine and a driven rotary member, such as the ventilating fan of an alternator, and particularly a coupling that will slip at high speed, so as to limit the speed of rotation of the driven member.

In motor vehicles, there are a large number of rotary devices driven at speeds that vary greatly because of the variation of the engine speed, although for an optimal function of these devices a constant speed of rotation would be desired. Examples of such devices are the electric generator, the engine fan, the water pump and the oil pumps. Couplings have become known that operate by the centrifugal force of weights revolving around a shaft, arranged so as to weaken the contact between the driving member and the driven member of the coupling after a particular upper speed range has been reached and thus to prevent the speed of the driven coupling member to increase further. Such arrangements have been disclosed in German Patent No. 20 53 263 and in German patent application DE OS No. 28 22 638 of the assignee of this application. In these known couplings, the power transmitting parts are subjected to a degree of friction which causes a great deal of wear and a high heat load. The couplings are thereby unreliable and must receive continual attention and maintenance.

SUMMARY OF THE INVENTION

It is an object of the present invention to provide a speed limiting rotary coupling that produces little wear on the parts and generates little heat when it is driven at high speeds and therefore provides considerable slip. It is a further object to provide such a coupling in a form economic to manufacture and also in a form suitable for fitting on equipment already in service or already manufactured.

Briefly, the portion of the coupling that transmits force is a rotary bearing having one bearing surface connected with the drive side of the coupling and another bearing surface connected with the driven side of the coupling, the bearing being lubricated and being subjected to a pressure allowing the bearing to slip mainly at high driven speed. A particularly effective form of the coupling utilizes ball bearings interposed either between radial or axial bearing surfaces, and it is particularly convenient to use two sets of ball bearings. The pressure is preferably applied by a suitable spring. Roller or needle bearings are also usable, as well as sintered bearings, and so on. A particularly useful arrangement includes two single-row ball bearings of the angular contact type with a spreading spring device between their outer rings, the bearings in this case being radial. In such an arrangement, it is particularly useful to have one of the outer bearing rings axially shiftable. It is possible when two bearing units are used for the bearings to use different kinds of bearings, for example a needle bearing and a ball bearing, an arrangement that is particularly useful for a retrofit coupling.

It is also useful to provide a annular permanent magnet on the portion of the coupling on the drive side of the coupling, in order to modify the coupling characterics by the generation of eddy currents.

The invention is further described by way of illustrative examples with reference to the annexed drawings, in which:

FIGS. 2a and 2b show second and tird embodiments of coupling according to the invention having, like FIG. 1, a radial bearing;

FIG. 3 shows a fourth embodiment of a coupling according to the invention, having an axial bearing;

DESCRIPTION OF THE ILLUSTRATED EMBODIMENTS

Figure 1:
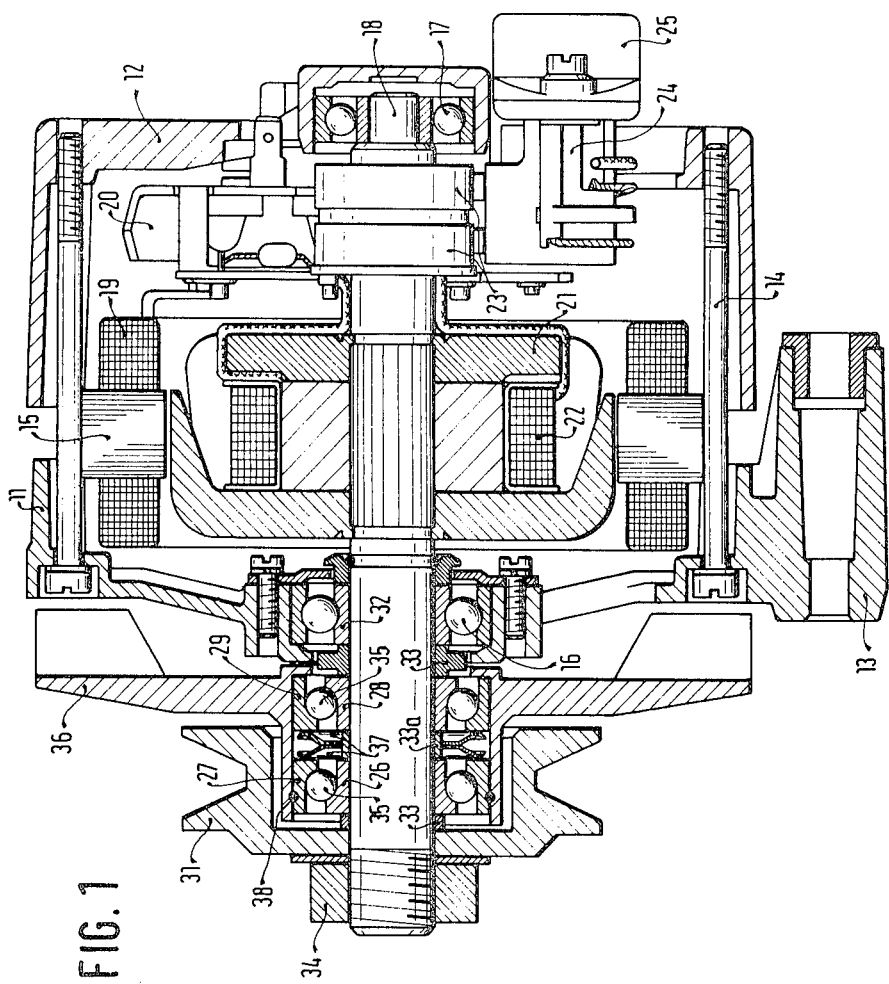
FIG. 1 is a sectional view of a motor vehicle alternator equipped with a first embodiment of a coupling according to the invention, for driving its ventialting fan.

FIG. 1 shows, in cross-section, a three-phase a.c. generator having a casing that includes an end-bell 11 on the side of the drive and an end-bell 12 on the slipring side. A mounting or positioning arm 13, useful for swinging the generator about a pivot to set the belt tension, is provided integral with the drive-side end-bell 11. A stator lamination stack 15 is clamped between the end-bells 11 and 12 by means of screws 14. Bearings 16 and 17 are seated in the respective end-bells 11 and 12, and the generator shaft 18 is held in the bearings. The stator 15 carries a stator winding 19. A rectifier, substantially all of which is mounted on a cooling body 20, is connected to the outputs of the stator winding 19. The generator shaft 18 carries a rotor 21 equipped with an exciter winding 22. The ends of the exciter winding 22 are respectively connected to the sliprings 23 that are likewise mounted on the shaft 18. Carbon brushes held in the brushholder 24 are in operative connection with the sliprings 23. The brushholder 24 is combined physically in one unit with a voltage regulator 25.

Two further ball bearings respectively having inner rings 26 and 28 and outer rings 27 and 29 are fitted on the shaft 18 outside the casing 11–12 on the drive side. The shaft 18 also carries on that side a belt pulley 31. Between the interior ring 32 of the bearing 16 and the interior ring 28, between the interior ring 28 and the interior ring 26, and between the interior ring 26 and the pulley 31 there is interposed in each case a spacing ring 33. By means of a nut 34, the pulley 31, the spacing rings 33 and the interior bearing rings 26 and 28 are pressed against the interior ring 32 of the bearing 16.

The exterior bearing rings 27 and 29 are freely rotatable on the ball 35 and on the exterior rings, a fan wheel 36 is seated. One of the two exterior rings, preferably the exterior ring 29 on the side facing the bearing 16, is pressed into the hub of the fan wheel 36. The other exterior ring 27 is then mounted in the hub of the fan wheel 36 in a manner which permits axial shifting.

The hub of the fan wheel 36 thus serves as the mounting for the exterior rings 27 and 29. By means of a spring element 37 which bears against the fixed outer ring 29, the two external rings 27 and 29 are urged away from each other. The force with which the exterior rings 27 and 29 are urged apart can be set by means, among others, of the thickness of the spacing ring 33a between the interior bearing rings 26 and 28. In the illustrated first embodiment, the spring element 37 is composed of two cup springs, of which one has its outer rim bearing against the exterior bearing ring 29 and the other has its rim bearing against the exterior bearing ring 27, while the inner edges of the two annular cup springs lie adjacent to and against each other. An O-ring 38 is set between the shiftable outer ring 27 and the hub of the fan wheel 36.

Figure 6:
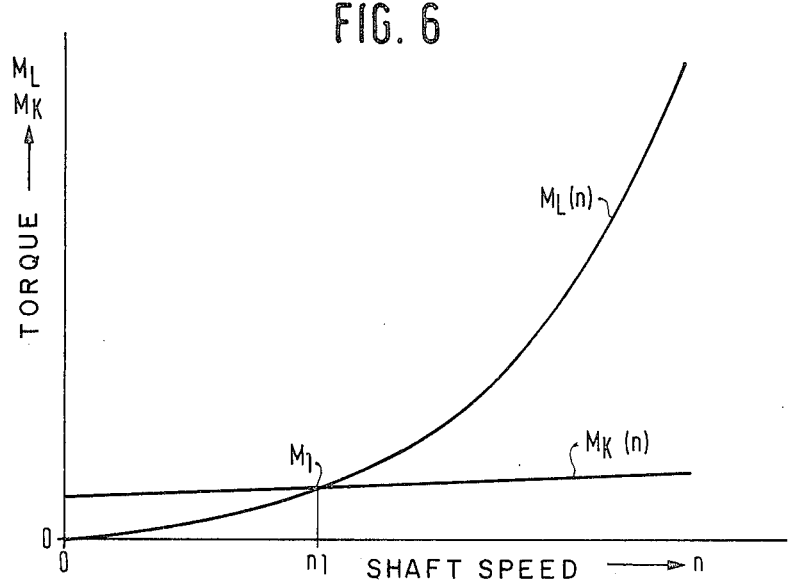
FIG. 6 is a graph for explaining the characteristics of couplings according to the invention.

The effect of the described coupling according to the invention is that the fan wheel 36 that pulls cooling air through the generator is not driven directly, but through the frictional torque of the bearings 26/35/27 and 28/35/29. As soon as the generator shaft begins to turn, the fan wheel 36 also gradually begins to turn. If the speed $n_w$ of the shaft 18 then remains low and constant, the fan wheel 36 after a short while reaches this rotation speed $n_w$ of the shaft 18. Up to a maximum value $n_1$, that is essentially predetermined by the constants of the cup springs 37 and the width of the spacing ring 33a, the fan wheel 36 then runs synchronously with the shaft 18. This speed value $n_1$ is determined by the essentially constant torque $M_K$, that is necessary to overcome the ball bearing friction. If now the speed $n_w$ of the shaft 18 increases above the predetermined value $n_1$ already mentioned, then the speed $n_L$ of the fan wheel 36 increases only insignificantly further. In the graph given in FIG. 6, the torque $M_K$ for overcoming the bearing friction and the course of the torque $M_L$ that is necessary to drive the fan wheel are plotted against speed. At the already mentioned speed value $n_1$, these two torques are equally large, thus $M_K = M_L = M_1$. In a speed range $0 \leq w \leq n_1$, the behavior of the coupling can be described as synchronous drive in which $n_L = n_w$ and $M_L \leq M_K$, whereas the machine shaft speeds $n_w < n_1$ the behavior can be described as asynchronous drive, for which $n_L < n_w$ and $M_L > M_K$.

For the spring element 37, instead of cup springs, there can be used, for further examples, an undulated spring ring, a helical spring or some other such element. Even with such elements, it is possible by the choice of the spring constant to help to set the speed up to which the fan wheel 36 should turn synchronously with the shaft 18. Since the ball bearings 26,27 and 28,29 do not turn while the shaft speed 18 is constant up to a limiting value of shaft speed already mentioned, and above this limiting value the speed of the fan wheel 36 is always smaller than the speed of rotation of the shaft 18, the ball bearings 26,27 and 28,29 can withstand whatever stress results from the increased friction losses of the ball bearings.

If a higher limiting value for synchronous speed of the fan wheel 36 is desired, this can be obtained by the methods already described through parallel disposition of several ball bearings between the shaft 18 and the fan wheel 36, or by means of an eddy current device. Eddy current devices of the kind just referred to are illustrated in FIGS. 2a and 2b. In FIG. 2a, a permanent magnet ring 41 is so provided on the belt pulley 31 that it stands opposite the disc shaped part of the fan wheel 36 across a small air gap. At operating speed, the pulley 31 seeks in a well-known manner to pull the fan wheel 36 along with it. In FIG. 2b, a magnet ring 42 in the shape of a cylindrical sleeve is affixed to the pulley 31. The magnet ring 42 turns around the hub of the fan wheel 36 with only a small air gap between them.

In the embodiments according to FIGS. 1, 2a and 2b, the drive-side coupling portion of the coupling are the shaft 18, 18′, 18″ and the interior bearing rings 26, 26′, 26″ and 28, 28′, 28″, the torque transmitting portion is made up of the interior rings 26, 26′, 26″ and 28, 28′, 28″ the balls 35, 35′, 35″ and the exterior rings 27, 27′, 27″ and 29, 29′, 29″ and the output side coupling portion is made up of the outer bearing rings 27, 27′, 27″ and 29, 29′, 29″ and the hub of the fan wheel 36, 36′, 36″. The necessarily slanted races of the ball bearings are here provided by the well-known angular ball bearing type of construction.

In the foregoing paragraph the primed reference numerals refer to FIG. 2a and the double-primed reference numerals refer to FIG. 2b, while the remainder (unprimed) refer to FIG. 1. Thus the bearings 26, 27 and 28, 29 of FIG. 1 correspond to the bearings 26′,27′ and 28′, 29′ of FIG. 2a and to the bearings 26″, 27″ and 28″, 29″ of FIG. 2b.

Figure 4:
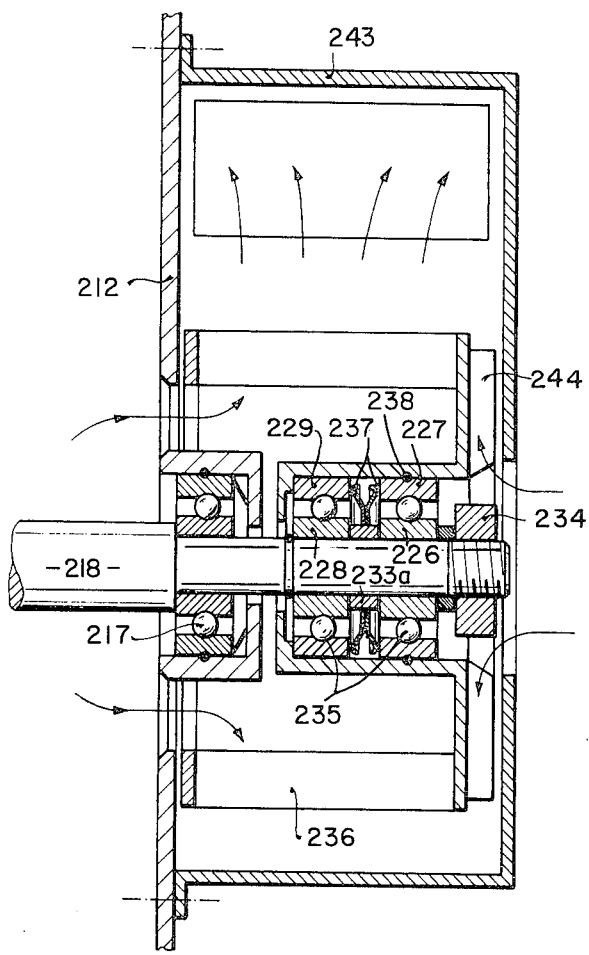
FIG. 4 shows a fifth embodiment of a coupling according to the invention, fitted to a drum-type blower for a generator.

In the embodiment according to FIG. 3, an axial bearing that operates on both sides against a central driven member is utilized as the torque transmitting portion. The function of the interior rings 26 and 28 of FIG. 1 is here taken over by the rings 126 and 128, and likewise the functions of the exterior rings 27 and 29 by the rings 127 and 129. In this embodiment, the rings 127 and 129 are formed of one piece and connected to the driven portion 126 of the coupling. The increase of friction is in principle obtained again by a cup spring operating as the spring element 137. The cup spring 137 in this third embodiment, however, is supported on a part that is fixed with respect to the shaft 118 and presses the ring 128 against the axial bearing 126, 127,128,129. In this case also further measures, for example, an eddy current drive, can also be provided. In the embodiment shown in FIG. 4, a drum-type blower is shown that is mounted on the slipring side of the generator. Components substantially the same as those of the first embodiment shown in FIG. 1 are designated with the same reference numerals. In this case, the bearings 226–229 utilize deep-grooved ball bearings. The drum-type blower 236 runs in a blower casing 243 that is screwed onto the end-bell 212 of the slipring side of the generator. The blower is of a known kind of construction and is therefore not further described here. For additional cooling of the hub of the blower 236 and therefore also of the ball bearings 226–229, additional blower blades 244 can be provided.

In the embodiments shown in FIGS. 1–4, only ball bearings hve been shown, with rings that serve as bearing surfaces. The invention can be practiced, however, also with the use of other rolling types of bearings, for example roller or needle bearings. It is also possible to use, instead of rolling bearings, sliding bearings, for example sintered bearings. In fact in each case illustrated, bearings of various kinds may be used.

Figure 5:
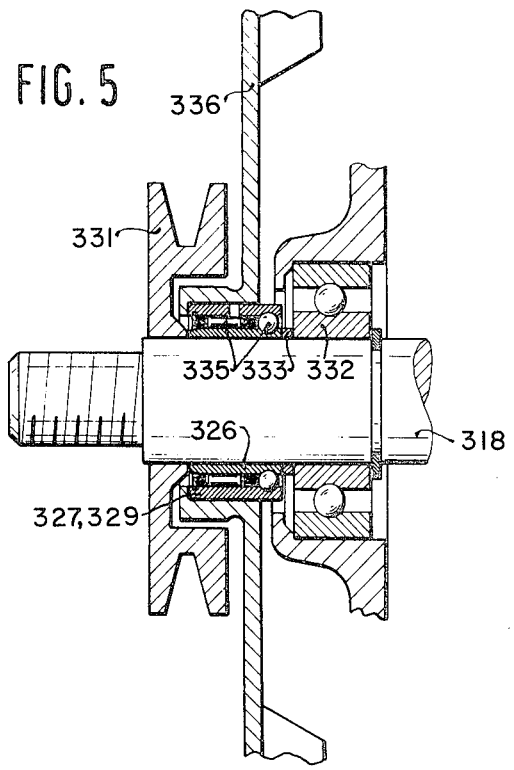
FIG. 5 shows a sixth embodiment of a coupling according to the invention constituting a retrofit unit.

FIG. 5 shows a retrofit unit or kit utilizing a mass-production combination needle and ball bearing. Such a retrofit kit is readily mounted on the shaft 318 of equipment already manufactured, or already in service, and is made up of merely three parts, the fan wheel 336, the belt pulley 337 and the deep-grooved ball bearing 326, which also has a built-in needle bearing. The drive side generator bearing 332 and the spacer ring 333 are also indicated in FIG. 5.

Thus, it will be seen that although the invention has been described with reference to particular illustrative embodiments, further variations and modifications are possible within the inventive concept.

I claim:

1. Electric generator for a motor vehicle, having a shaft driven from the vehicle engine, having a fan for cooling the generator and having, seated on said shaft a friction coupling for driving said fan with a speed-limiting drive characteristic for said fan, which fan comprises:

first and second bearings each having rolling bearing elements, a first bearing race ring (26,28; 126, 128; 226,228) supported on said generator shaft and a second bearing race ring (27,29; 127,129; 227,229) affixed to said fan;

said first and second ring of each said bearing being constituted so as to hold said bearing elements, as the latter roll, at a constant spacing from said generator shaft, and spring action pressure-producing means (37) for exerting pressure parallel to the axis of said shaft mounted for exerting said pressure as a relative force acting on said second rings (27,29; 127,129; 227,229) of both said bearings.

2. Generator according to claim 1, in which both said bearings are radial bearings and said first rings thereof are radially interior rings and said second rings thereof are radially exterior rings.

3. Generator according to claim 2, in which said said bearings are both deep-groove ball bearings.

4. Generator according to claim 1, in which said first and second bearings are oblique contact ball bearings, said first rings thereof are radially interior rings and said second rings thereof are radially exterior rings, and said spring action means (37) are constituted by at least compression-stressed member interposed between said second rings of said respective bearings.

5. Generator according to claim 3 or 4, in which a spacing ring (33a) is interposed between the respective said first rings (26,28) of said first and second bearings.

6. Generator according to claim 4, in which one (27) of said second rings of said respective first and second bearings is axially shiftable with respect to said shaft (18,118) and to said fan (36,136).

7. Generator according to claim 1 in which said first and second bearings are axial bearings (126, 127; 128,129).

8. Generator according to claim 7, in which said second rings (127,129) of said respective first and second bearings are combined into an integral member and in which said spring action pressure-producing means (37) comprise at least one compression-stressed member (137) provided between a collar at least axially fixed on said shaft and said first ring (128) of said second bearing, the latter being mounted so as to be axially shiftable with respect to said shaft.

9. Generator according to claim 2, 4 or 8, in which said spring action pressure-producing means (37,137) is constituted by at least one annular cup spring.

10. Generator according to claim 9, in which said spring action pressure-producing means (37,137) is constituted by two cup spring parts put together in such a way that the rim portions of said cup spring parts diverge from each other.

11. Generator according to claim 7, in which said bearing elements are balls.

12. Generator according to claim 1, having also permanent magnet means (41,42) mounted in fixed position with respect to said shaft in such a way as to face a metallic portion of said fan (36), for inducing eddy currents in said metallic portion of said fan.

13. Generator according to claim 12, in which said permanent magnet means (42) is constituted by a cylindrical shell.

14. Generator according to claim 12, in which said permanent magnet means (41) is constituted by an annular body having an annular disk surface opposite said portion of said fan (36).

* * * * *